(12) United States Patent
Wang et al.

(10) Patent No.: US 9,314,800 B2
(45) Date of Patent: Apr. 19, 2016

(54) APPARATUS AND PROCESS FOR HIGH THROUGHPUT POWDER PRODUCTION

(71) Applicant: HESTIA TEC LLC, Pasadena, CA (US)

(72) Inventors: Hai Wang, Palo Alto, CA (US); Yang Lee Wang, Alhambra, CA (US); Erin Napua Kampschroer, Los Angeles, CA (US)

(73) Assignee: HESTIA SYSTEMS, LLC, Alexandria, VA (US)

( * ) Notice: Subject to any disclaimer, the term of this patent is extended or adjusted under 35 U.S.C. 154(b) by 135 days.

(21) Appl. No.: 14/052,494

(22) Filed: Oct. 11, 2013

(65) Prior Publication Data

US 2015/0102514 A1    Apr. 16, 2015

(51) Int. Cl.
*B05B 7/20* (2006.01)
*B05B 1/00* (2006.01)
*H01M 4/00* (2006.01)
*B05B 5/10* (2006.01)

(52) U.S. Cl.
CPC . *B05B 1/00* (2013.01); *B05B 7/201* (2013.01); *H01M 4/00* (2013.01); *B05B 5/10* (2013.01)

(58) Field of Classification Search
None
See application file for complete search history.

(56) References Cited

U.S. PATENT DOCUMENTS

| | | | |
|---|---|---|---|
| 5,858,324 A | 1/1999 | Dahn et al. | |
| 5,958,362 A | 9/1999 | Takatori et al. | |
| 6,514,640 B1 | 2/2003 | Armand et al. | |
| 8,329,071 B2 | 12/2012 | Wang et al. | |
| 8,821,771 B2* | 9/2014 | Badding et al. | 264/5 |
| 2008/0280056 A1 | 11/2008 | Maric et al. | |
| 2008/0305256 A1 | 12/2008 | Kimble et al. | |
| 2013/0043437 A1 | 2/2013 | Wang et al. | |
| 2013/0224595 A1* | 8/2013 | Nuspl et al. | 429/220 |
| 2013/0273430 A1* | 10/2013 | Axelbaum et al. | 429/224 |
| 2013/0316233 A1* | 11/2013 | HIRAYAMA et al. | 429/211 |

FOREIGN PATENT DOCUMENTS

| | | |
|---|---|---|
| EP | 1268054 B1 | 1/2003 |
| JP | 2013-017957 A | 1/2013 |
| WO | 2012-018863 A2 | 2/2012 |

OTHER PUBLICATIONS

International Search Report and Written Opinion issued in PCT/US2014/060051, dated Jan. 15, 2015.
Gao et al., "Preparation and characterization of nano-particle LiFePO4 and LiFePO4/C by spray-drying and post-annealing method", Electrochimica Acta (2007) 53:1939-1944.
Higuch et al., "Synthesis of LiFePO4 cathode material by microwave processing", Journal of Power Sources (2003) 119-121:258-261.

(Continued)

*Primary Examiner* — Mary F Theisen
(74) *Attorney, Agent, or Firm* — McDermott Will & Emery LLP (57) ABSTRACT

Apparatuses and processes for forming powder are disclosed. The apparatus includes a chamber having a head plate and an array of aerosol and burner nozzles attached to the head plate for generating aerosols and flames respectively. Powder is produced by atomizing a liquid composition to project an aerosol of droplets into the chamber and heating the aerosol with flames projected by the burner nozzles.

21 Claims, 7 Drawing Sheets

(56) References Cited

OTHER PUBLICATIONS

Konarova et al., Preparation of carbon coated LiFePO4 by a combination of spray pyrolsis with planetary ball-milling folliowied by heat treatment and their electrochemical properties, Power Technology (2009) 191:111-116.

Liu et al., "Nanoporous spherical LiFePO4 for high performance cathodes", Energy Environ. Sci. (2011) 4:885-888.

Myojin and Ogihara et al., "Synthesis of non-stoichiometric lithium manganite fine powders by internal combustion-type spray pyrolysis using gas burner", Advance Powder Technology (2004) 15:397-403.

Ogihara et al, "Preparation and electrochemical properties of cathode materials for lithium ion battery by aerosol process", Material Science and Engineering B (2009) 161:109-114.

Ogihara et al, "Preparation of Submicrometre Spherical Oxide Powders and Fibres by Thermal Spray Decomposition using Ultrasonic Atomiser", J. Material Chemistry (1991) 1(5):789-794.

Ogihara, T, "Preparation and electrochecmical properties of cathode and anode materials for lithium ion battery by aerosol process" Lithium Ion Batteries-New developments, Belharouak (ed.), Intech publisher, published online Feb. 24, 2012.

Toprakci et al., "Fabrication and Electrochemical Characteristics of LiFePO4 Powders for Lithium-Ion Batteries", Kona Powder and Particle Journal (2010) 28:50-73.

Yu et al., "Preparation and characterization of mesoporous LiFePO4/C microsphere by spray drying assisted template method", Journal of Power Sources (2009) 189:794-797.

Waser et al., "Continuous flame aerosol synthesis of carbon-coated nano-LiFePO4 for Li-ion batteries", J. Aerosol Sci. (2011) 42:657-667.

Jugovic, et al., "A Review of recent developments in the synthesis procedures of lithium iron phosphate powders", Journal of Power Sources (2009) 190:538-544.

* cited by examiner

APPARATUS AND PROCESS FOR HIGH THROUGHPUT POWDER PRODUCTION

TECHNICAL FIELD

The present disclosure relates to apparatuses for high throughput powder production and production of powders.

BACKGROUND

Various processes for producing powders have been known and implemented at the industrial manufacturing scale for many years. Large scale production of powders can be classified in two general categories which include solid state methods and solution-based methods. Solid state methods are generally simple to implement but are typically time and energy intensive and often lead to relatively larger particle sizes and lower purity. They are almost always implemented as batch processes that lead to batch to batch variability. Solution-based methods generally tend to be more complex but often lead to relatively smaller particle sizes, more homogeneous and uniform particles, and with higher purity. Solution-based process can typically be operated continuously. However, solution based processes suffer from relatively low production rates compared to solid-state methods and are therefore used for only low volume specialty powders.

Large scale production of cathode materials for rechargeable batteries has gained significant attention in recent years due to the increasing popularity of such batteries for portable electronics and for electric and hybrid-electric vehicles. Both solid state and solution-based methods have been used to produce cathode materials for rechargeable batteries. See Toprakci et al., "Fabrication and Electrochemical Characteristics of $LiFePO_4$ Powders for Lithium-Ion Batteries", KONA Powder and Particle Journal, 2010:28:50-73; Jugovic et al., "A Review of recent developments in the synthesis procedures of lithium iron phosphate powders", Journal of Power Sources 2009:190:538-544.

Solution based methods for producing cathode materials offer advantages of relatively smaller particle sizes, homogeneity and purity and typically require few processing steps but suffer from low production rates. Attempts at mass production of lithium based cathode materials using aerosols and gas burners have been disclosed. See, e.g., Ogihara et al., "Preparation and electrochemical properties of cathode materials for lithium ion battery by aerosol process", Material Science and Engineering B 2009:161:109-114 and Myojin and Ogihara et al., "synthesis of non-stoichiometric lithium manganite fine powders by internal combustion-type spray pyrolysis using gas burner", Advance Powder Technology, 2004:15:397-403. However, the production rates are still relatively low. Accordingly, a continuing need exists for improved production methods for producing powder for large scale manufacturing.

SUMMARY OF THE DISCLOSURE

Advantages of the present disclosure include a high through-put apparatuses and processes for forming powder.

These and other advantages are satisfied, at least in part, by an apparatus for producing powder. The apparatus comprises a chamber having a head plate and an array of nozzles attached to the head plate. The array of nozzles advantageously includes at least one aerosol nozzle for introducing an aerosol of droplets into the chamber and at least two burner nozzles directly adjacent the at least one aerosol nozzle for projecting flames into the chamber. Preferably, the aerosol and flames are oriented in the same general flow direction into the chamber. The apparatus can include an exit port connected to the chamber which allows produced powder to exit the chamber and a collection system in fluid communication with the exit port to collect produced powder exiting the chamber. Advantageously, the apparatus of the present disclosure can produce powders at high production rates, e.g., a production rate of greater than 1 kilogram per hour (kg/hr), e.g., greater than about 5 kg/hr to about 200 kg/hr.

Embodiments of the present disclosure include wherein the array of nozzles includes at least 2 to about 200 or more aerosol nozzles, each of which are directly adjacent and among at least two burner nozzles and wherein the array of nozzles includes at least three burner nozzles directly adjacent each aerosol nozzle. Preferably the distance among nozzles is less than about 400 mm as measured from the center of the respective nozzles. Advantageously, the aerosol nozzles of the present disclosure can be any aerosol nozzle that can direct an aerosol of droplets into the chamber of the apparatus. Aerosol nozzles that directly form an aerosol of droplets include, for example, hydraulic, pneumatic, and ultrasonic spray nozzles and have atomization rates of from about 0.5 l/hr to about 12 l/hr or higher per nozzle and can form droplets having mean droplet diameters as small as about 10 microns and up to about 500 microns. Additionally, the burner nozzles of the present disclosure can be any burner nozzle that can project a flame into the chamber of the apparatus such that the flames from the burner nozzles are sufficient to effectively heat the aerosol of droplets to powder.

Other aspects of the present disclosure include a process of forming a powder. The process comprises atomizing a liquid composition to project an aerosol of droplets having a flow direction into a chamber through at least one aerosol nozzle and converting the aerosol of droplets to powder by heating the aerosol of droplets with at least two burner nozzles that are directly adjacent the at least one aerosol nozzle and that each project a flame that is adjacent the aerosol of droplets and wherein the flames provide heat to convert the aerosol of droplets to a powder. The liquid composition of the present disclosure contains a liquid medium, e.g., an aqueous medium, and one or more dissolved or suspended precursors and other optional ingredients that result in the production of powder. A wide variety of powders can advantageously be manufactured by the apparatus of the present disclosure including ceramic, active electrode powders for secondary batteries and fuel cells, etc.

Embodiments of the present disclosure include use of all of the various configurations described for the apparatuses for producing powder. The process of the present disclosure is advantageously scalable such that the liquid composition can be atomized through 2 to 200 or more aerosol nozzles. Advantageously, the liquid composition contains precursors to form one or more active electrode powders, e.g., one or more active lithium metal or mixed metal phosphate powders, and optionally one or more dopant precursors and optionally one or more carbon precursors.

Other aspects of the present disclosure include forming a secondary battery with an electrode, e.g., a cathode electrode, containing one or more active electrode powders produced according to the present disclosure and further comprising forming a secondary battery with the electrode.

Additional advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various respects, all without departing from the invention. Accordingly, the drawings and description are to be regarded as illustrative in nature, and not as restrictive.

BRIEF DESCRIPTION OF DRAWINGS

Reference is made to the attached drawings, wherein elements having the same reference numeral designations represent similar elements throughout and wherein.

DETAILED DESCRIPTION OF THE DISCLOSURE

The present disclosure is directed to apparatuses and processes that can produce powders at high production rates, e.g., a production rate of greater than 1 kilogram per hour (kg/hr), e.g. greater than about 5, 10, 20, 30, 50, 100 kg/hr and even greater than about 200 kg/hr.

The apparatus of the present disclosure offers advantages over conventional spray drying configurations which include introducing an aerosol into a furnace. In such conventional spray drying configurations, an aerosol is dried by heat which radiates from the walls of the furnace toward the center of the aerosol. In some aerosol drying configurations, a portion of the heat is used to heat the furnace which then is transferred to the aerosol. In an attempt to accommodate large scale production, such conventional spray drying configurations also generally require a relatively large furnace. However, the temperature differences from the outer wall to the center of the furnace during operation typically increases with larger furnaces thereby resulting in higher temperature variability though the aerosol sprayed in to the furnace.

The configuration of the apparatus of the present disclosure is advantageously compact and can provide a more uniform temperature gradient in and among the aerosol. In accordance with embodiments of the present disclosure, burner nozzles are directly adjacent and among one or more aerosol nozzles which allow for a more uniform temperature gradient throughout the aerosol and more efficient heating of the aerosol since the flames generated by the burners are used primarily and directly to heat an aerosol of droplets introduced by the one or more aerosol nozzles. Consequently, the configuration of the apparatus of the present disclosure can advantageously accommodate significantly greater production rates at a more compact size. The configuration of nozzles of the present disclosure is also advantageously scalable without substantial loss of temperature uniformity throughout the aerosol of droplets.

In one aspect of the present disclosure, an apparatus for producing powder includes a chamber having a head plate and an array of nozzles attached to the head plate. An array of nozzles as used herein means at least one aerosol or spray nozzle directly adjacent at least two burner nozzles. However, the array need not have a total number of burner nozzles that is twice the total number of aerosol nozzles in the array since one or more burner nozzles can be adjacent more than one aerosol nozzle. In addition, the at least one aerosol nozzle need not be directly between the at least two burner nozzles in the array and the array need not be entirely a regular array of nozzles. Preferably, the array of nozzles includes at least 2, 4, 6, 8, 10, 20, 30, 40, 50, 100, 200 or more aerosol nozzles, each of which are directly adjacent and among at least two burner nozzles. The aerosol nozzle(s) in the array is/are to introduce an aerosol of droplets into the chamber and each burner nozzle is to project a flame into the chamber.

As used herein, an aerosol means a dispersion of solid and/or liquid particles suspended in a gas. An aerosol of droplets, as used herein, refers to a dispersion of liquid droplets suspended in a gas. The rate of atomization is the rate that a liquid composition is converted to an aerosol of droplets per unit time, e.g., liter/hour (l/hr).

The aerosol nozzles of the present disclosure can be any aerosol nozzle that can direct an aerosol of droplets into the chamber of the apparatus. The size and type of the aerosol nozzle will depend on several factors including the amount and quality, e.g., size and size distribution of the aerosol, the tolerances for clogging, temperature and chemical resistance, the desired spray angle, etc. In accordance with embodiments of the present disclosure, the aerosol nozzles can atomize a liquid composition into an aerosol of droplets directly or act as a conduit for an aerosol of droplets formed in a separate chamber and carried to the aerosol nozzle such as in an ultrasonic mister disposed at a distance away from the aerosol nozzle where the aerosol of droplets is generated in the mister and carried to the nozzle via a carrier gas. Aerosol nozzles that directly form an aerosol of droplets include, for example, hydraulic, pneumatic, and ultrasonic spray nozzles and have atomization rates of from about 0.5 l/hr, 1 l/hr, 2 l/hr, 4 l/hr, 6 l/hr, 8 l/hr, 10 l/hr to about 12 l/hr or higher per nozzle and can form droplets having mean droplet diameters as small as about 10 microns and up to about 500 microns. Such aerosol nozzles are commercially available.

The burner nozzles of the present disclosure can be any burner nozzle that can project a flame into the chamber of the apparatus such that the flames from the burner nozzles are sufficient to effectively heat the aerosol of droplets to powder. The size and type of the burner nozzle will depend on the amount and quality of heat needed to process the aerosol of droplets introduced by the one or more aerosol nozzles into the desired product powder. Additional factor for selecting the size and type of burner nozzles and their operation include, for example, the rate of atomization, the arrangement and number of aerosol nozzles to the burner nozzles, the shape of the flame projected from the burner nozzle, flame stability, flame shape, fuel/oxidizer operating ratio, flame temperature, flow velocity, the level of turbulence etc. Example burner nozzles that can be used in the apparatus of the present disclosure include blowtorch, diffusion, pre-mix or nozzle-mix gas burners (available from Selas Heat Technology, USA, Fives North American Combustion, Inc., USA). Such burner nozzles have capacities of from about 500 BTU to about 100,000 BTU/hr and flame temperatures of around 1,400 K to about 3,000 K depending on the fuel and oxidant used to produce the flame and the pressure and ratio of the fuel and oxidant.

Combustion of a fuel, as through the burner nozzles, is an effective means for providing heat to a point or area. The apparatus of the present disclosure advantageously directs the heat from the combustion of a fuel from the burner nozzles to process an aerosol of droplets. In accordance with embodiments of the present disclosure, it is preferable that the one or more aerosol nozzles are directly adjacent at least two burner nozzles. The closer the aerosol nozzles to the burner nozzles the more effective is the heat transfer from the flame to the aerosol. However, the temperature of the flames from the burners can be too high for contact by the aerosol of droplets for certain powder production processes and consequently the distance between the aerosol and burner nozzles and the flame configuration can be optimized based on the intended powder product.

In one embodiment of the present disclosure, the one or more aerosol nozzles and burner nozzle are at a distance such that the aerosol of droplets directed from the aerosol nozzles generally do not contact the flames generated by the burner nozzles but are close enough to effect conversion of the aerosol of droplets to powder. Preferably the distance among nozzles is less than about 400 mm, preferably less than about 300, 200, 100 mm, measured from the center of the respective nozzles.

It is also preferable that the aerosol and burner nozzles are oriented to direct their respective aerosols or flames in the same general flow direction into the chamber. Such an arrangement allows a compact configuration. Such an arrangement is also scalable to include a plurality aerosol nozzles, e.g., at least 2, 4, 6, 8, 10, 20, 30, 40, 50, 100, 200 or more aerosol nozzles, each of which are directly adjacent at least two burner nozzles.

Figure 1:
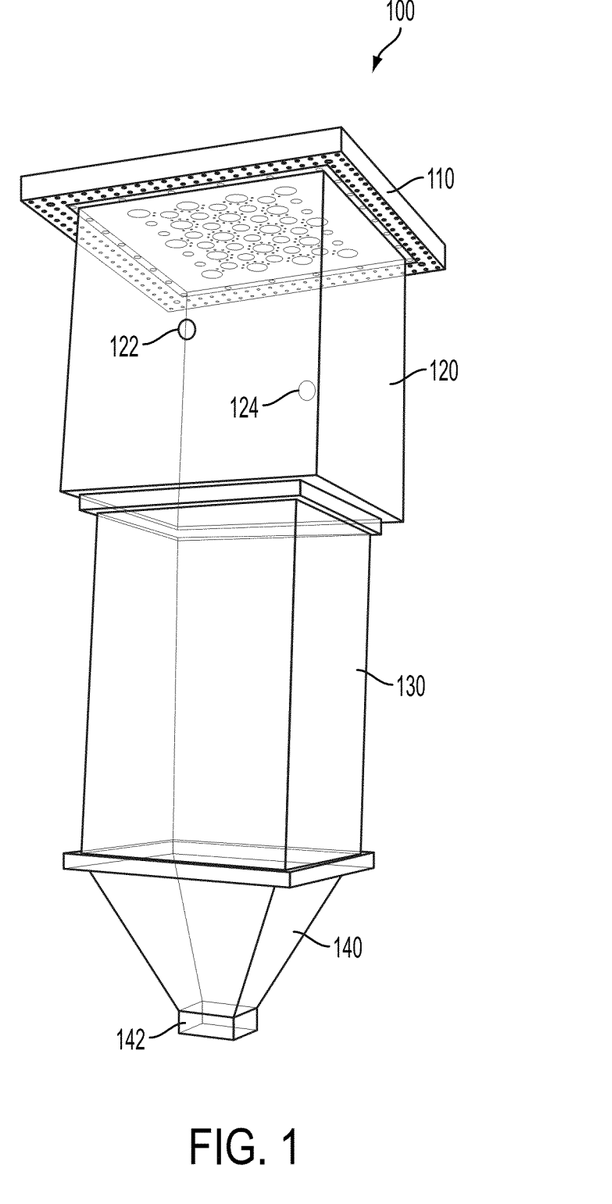
FIG. 1 is a schematic illustration of an embodiment of a high throughput powder producing apparatus of the present disclosure.

The following embodiments further exemplify the apparatus of the present disclosure. For example, FIG. 1 illustrates an embodiment of a high throughput powder producing apparatus of the present disclosure. As shown in FIG. 1, apparatus 100 includes head plate 110, first chamber 120, second chamber 130, and converging neck 140. Head plate 110 includes an array of aerosol spray nozzles and burner nozzles which are described in more detail in FIGS. 2A and 2B. The aerosol nozzles and burner nozzles are directed into first chamber 120 where the aerosol is heated and optionally mixed with other material, e.g., carbon generated by one or more of the burner nozzles or carbon generated by a burner located at a position away from head plate 110 such as in either first chamber 120 or second chamber 130. In this embodiment, first chamber 120 is a jacketed chamber with ports 122 and 124 to allow a fluid, e.g., a gas or liquid, to enter and exit first chamber 120. The fluid that enters and exits first chamber 120 can be used to circulate around an inner wall of chamber 120 (not shown for illustrative convenience) and to maintain first chamber 120 at a predetermined temperature or predetermined temperature range, e.g., from about 100° C. to about 800° C., e.g., from about 150° C. to about 500° C. or between about 300° C.-450° C. The circulating fluid used in the first chamber 120 can be the fuel used by the burner nozzles to generate the flames in chamber 120. By using the fuel as a medium to circulate in the jacket of first chamber 120, the fuel can be heated prior to combustion which facilitates combustion of fuel in first chamber 120. Other circulating fluids can be used to heat or cool first chamber 120.

As further shown in FIG. 1, first chamber 120 is in fluid connection with second chamber 130. Second chamber 130 can be at another temperature than first chamber 120 or at the same temperature as first chamber 120. Second chamber 130 can be used to allow additional processing of the aerosol generated by the array of spray nozzles such as to dry and/or anneal and/or mix particles formed in the process. Converging neck 140 converges gases and the particles formed in first and second chambers 120 and 130 as they flow from head plate 110 through first and second chambers 120 and 130 to exit the apparatus at exit port 142. Connected to exit port 142 is a collection system (not shown for illustrative convenience) to collect powder generated in the process of operating apparatus 100. The collection system can include any conventional system for collecting a powder produced by an aerosol and the like which include, for example, using a bag house, electrostatic precipitator, cyclone, thermophoretic deposition etc.

Apparatus 100 in FIG. 1 is shown with a vertical orientation where particles generated by the nozzles flow from head plate 110 to first chamber 120 to second chamber 130 and converging neck 140 in a generally vertical direction. In addition to the vertical orientation shown in FIG. 1, apparatus 100 can be oriented generally horizontal, i.e., rotating apparatus 100 by about 90 degrees, or inverted, i.e., rotating apparatus 100 by about 180 degrees, or any orientation therebetween, for example.

Each of the components shown for FIG. 1 can be made of a material that is appropriate for the production of powder generally or of a particular powder specifically. Appropriate component materials are typically those that can withstand the temperatures and aerosol chemistry and their products. Such materials include for example a metal, e.g., steel, stainless steel, aluminum, etc., a ceramic, a glass or combinations thereof. In this embodiment, head plate 110, first chamber 120, second chamber 130 and converging neck 140 are all made of stainless steel.

Figure 2A:
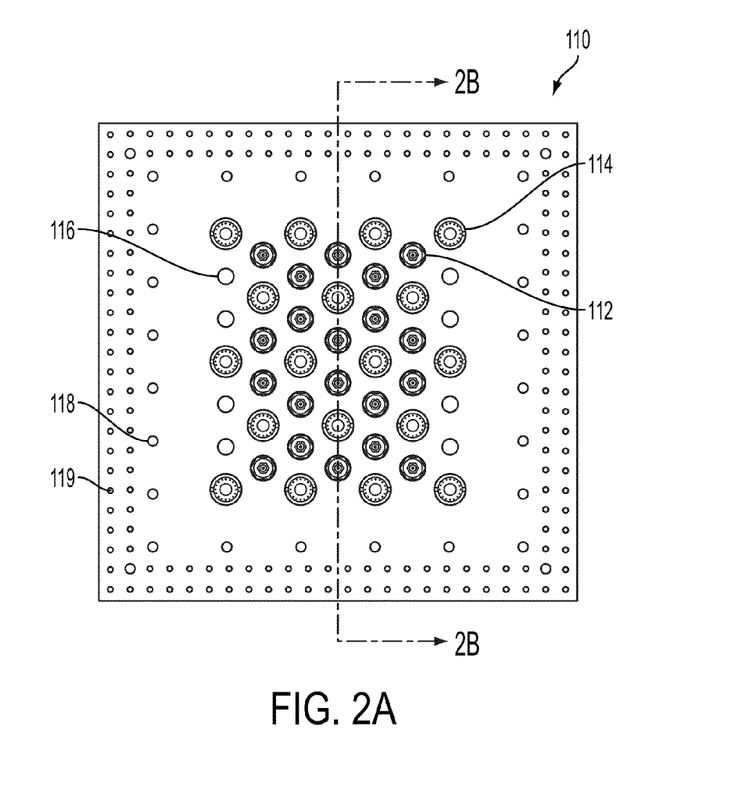
FIGS. 2A and 2B illustrate the head plate of the apparatus shown in FIG. 1.
Figure 2B:
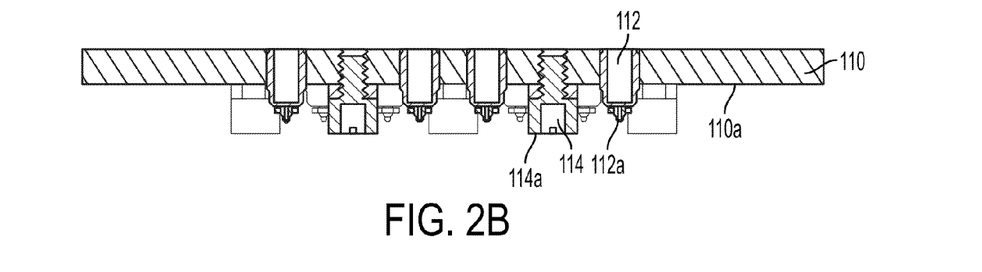

FIGS. 2A and 2B further illustrate head plate 110 of FIG. 1. FIG. 2B is a sectional view of FIG. 2A. As shown in FIG. 2A, head plate 110 includes an array of spray nozzles 112 to generate an aerosol of droplets and an array of burner nozzles 114 to generate directly flames adjacent the aerosol of droplets. In this embodiment, head plate 110 includes an array of twenty (20) spray nozzles 112 and eighteen (18) burner nozzles 114. As discussed above, it is preferable to have each aerosol nozzle directly adjacent to at least two burner nozzles and to orient the aerosols and burner nozzles to direct their respective aerosol and flames in the same general flow direction. In the present embodiment, each aerosol nozzle is directly adjacent three burner nozzles and all nozzles are oriented to project either an aerosol of droplets or a flame in the same flow direction, i.e. away from head plate 110 and into first chamber 120. FIG. 2A also shows that burner nozzles 114 are configured to be located at the periphery of the array of nozzles. When the burner nozzles are located on the periphery of the array, all of the aerosol of droplets generated by the aerosol nozzles can more or less be surrounded by flames generated by the burners.

As further illustrated in FIG. 2A, head plate 110 includes several blanks 116 that can be used to add an additional aerosol or burner nozzle. Although blanks 116 can accommodate either aerosol or burner nozzles, it is preferable that there are no aerosol nozzles on the periphery of the array of nozzles so that the aerosol of droplets generated by the aerosol nozzles are more or less surrounded by the flames produced by the burner nozzles. Head plate 110 further includes bolt holes 118 for bolts to fasten head plate 110 to first chamber 120 and a series of holes 119 on the periphery of head plate 110. Holes 119 can be used with bolts or other fasteners to secure scaffolding to hold tubing, cables, etc. outside of the apparatus for the operation of the apparatus and to secure the apparatus itself when in operation. These additional features are not necessary to the operation of the apparatus but can be helpful in practice.

FIG. 2B is a sectional view of FIG. 2A. In this embodiment, FIG. 2B shows aerosol nozzles 112 and burner nozzles 114 have tips (112a and 114a, respectively) that are positioned at distances that are different from the interior surface 110a of head plate 110. Burner nozzles 114 have tips 114a that are positioned at a distance from the interior surface 110a of head plate 110 that is greater than the distance of the tips 112a of aerosol nozzles 112 from the interior surface 110a of head plate 110. By this configuration, the aerosol of droplets can be introduced into the chamber at a distance prior to the generation of the flames. The opposite positioning of the tips of the respective aerosol and burner nozzles can also be configured.

The apparatus illustrated in FIG. 1 can readily have a production rate of greater than 1 kg/hr. Hourly production rates as used herein are determined by the following expression: Hourly production rate (kg/hr)=multiplying the concentration of precursor in liquid composition (moles/1 or M)×number of aerosol nozzles×the rate of atomization per nozzle (liter/hour-nozzle (l/hr-nozzle))×formula weight of the product powder (g/mole)×1/1000 (kg/g). Production rates over periods of days and years can be calculated by multiplying the hourly production rate by 24 hr/day or by (24 hr/day×300 day/yr), respectively. For example, production of lithium iron phosphate (LiFePO$_4$, formula weight of about 157.8 g/mole) using a relatively dilute liquid composition containing the precursor at 0.2M and with 20 aerosol nozzles operating at 4 l/hr per nozzle yields a production rate of about 2.5 kg/hr. With a more concentrated liquid composition of 1 M, the production rate is about 12.5 kg/hr, or about 300 kg/day, or about 90 metric tones/yr.

As discussed above, the apparatus of the present disclosure is relatively compact given its potential production rate. For example, the apparatus shown in the embodiment of FIG. 1 has an overall length of about 54 inches (137 cm). For example, head plate 110 can have dimensions for height× width×thickness of approximately 24×24×¾ inches (61×61×2 cm); first chamber 120 can have dimensions for height×width×length of approximately 22×22×17 inches (56×56×43 cm), second chamber 130 can have dimensions for height×width×length of approximately 20×20×22 inches (51×51×56 cm); converging neck can have dimensions for height×width×length of approximately 20×20×14 inches (51×51×36 cm) for the height and width dimensions near the second chamber. Such an apparatus having an array of at least twenty (20) aerosol nozzles and eighteen burner nozzles where each aerosol nozzle is directly adjacent three burner nozzles can produce powder at about 2.5 kg/hr using a relatively dilute liquid composition for LiFePO$_4$ production and can produce powder at about 12.5 kg/hr with a more concentrated liquid composition for LiFePO$_4$, for example.

Figure 3:
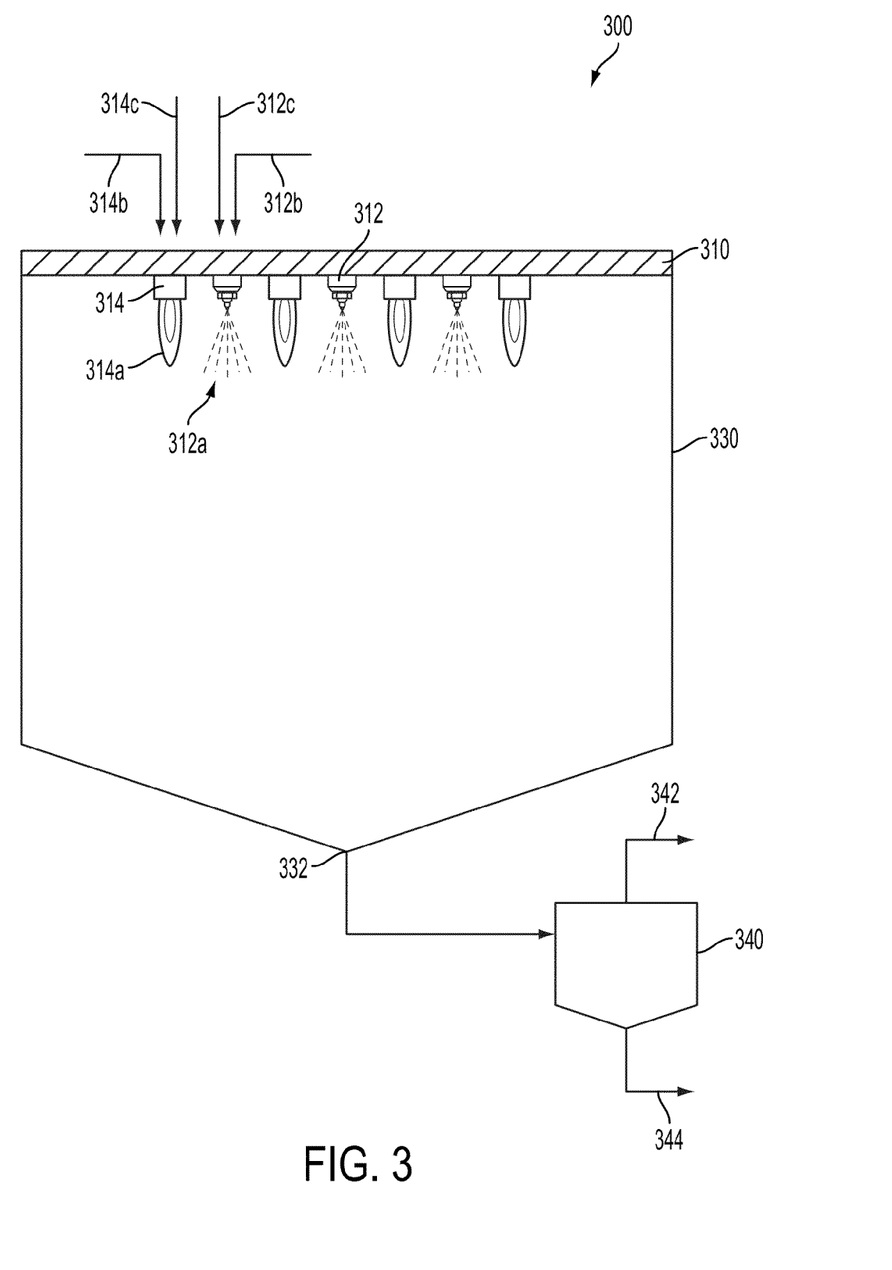
FIG. 3 is a schematic illustration of an operation of an embodiment of a high throughput powder producing apparatus of the present disclosure.

FIG. 3 is a schematic illustration of an operation of an embodiment of a high throughput powder producing apparatus of the present disclosure. As shown in FIG. 3, apparatus 300 includes head plate 310, mixing chamber 330 and collector 340. Mixing chamber 330 converges to exit port 332 which is in fluid communication with collector 340. Collector 340 further includes venting system 342 to vent gases produced by the operation of apparatus 300 and collection system 344 to collect powder produced by operation of apparatus 300. Attached to head plate 310 are an array of aerosol nozzles 312 and burner nozzles 314.

As shown in FIG. 3, aerosol nozzles 312 project aerosol of droplets 312a into chamber 330 and burner nozzles 314 project flames 314a into chamber 330. In this embodiment, aerosol nozzles 312 are pneumatic spray nozzles that introduce aerosol of droplets 312a into mixing chamber 330. The aerosol of droplets 312a are generated by combining a liquid composition through feed line 312b with an atomizing gas through feed line 312c to aerosol spray nozzles 312. Feed lines 312b and 312c are in fluid communication with spray nozzles 312 and with the liquid composition and atomizing gas sources, respectively. As described in more detail in other embodiments, the liquid composition includes a liquid medium and one or more precursors to form powder and optionally includes one or more other ingredients. The atomizing gas can be any gas that can atomize the liquid composition, e.g., steam or preferably an inert gas, such as nitrogen, argon, etc.

In this embodiment, burner nozzles 314 are premix gas burners (available from, for example, Selas Heat Technology, USA) that project a spear flame into mixing chamber 330, i.e. a flame in the shape of a spear. The flames 314a are generated by combining a fuel through fuel feed line 314b with an oxidant through feed line 314c to burner nozzles 314 and combusting the fuel. Feed lines 314b and 314c are in fluid communication with burner nozzles 314 and with fuel and oxidant sources, respectively. As described in more detail in other embodiments, the fuel can be any combustible gas or liquid, e.g., a hydrocarbon, and the oxidant can be any material that oxidizes the fuel, e.g., oxygen, air, etc. The burner nozzles can each have capacities of between about 500 BTU/hr to about 100,000 BTU/hr (e.g., between about 9,000-33,000 BTU/hr) depending on several factors such as the type of fuel and oxidant introduced to the burner nozzle to generate the flame, the pressure of the fuel and oxidant, the ratio of the fuel to oxidant introduced to the burner nozzle, etc. In one aspect of the present disclosure, each burner generates a flame having a temperature at the tip of the flame at around 1,400 K (1,127° C.) to about 3,000 K (2,727° C.).

For certain processes, it is preferred that the aerosol of droplets do not contact the flames so that the aerosol of droplets do not experience the full temperature and oxidation environment of the flames. As shown in FIG. 3, the aerosol nozzles and burner nozzles are at a distance such that most if not substantially all of the aerosol of droplets generated from the aerosol nozzles do not contact the flames generated by the burner nozzles.

Figure 4:
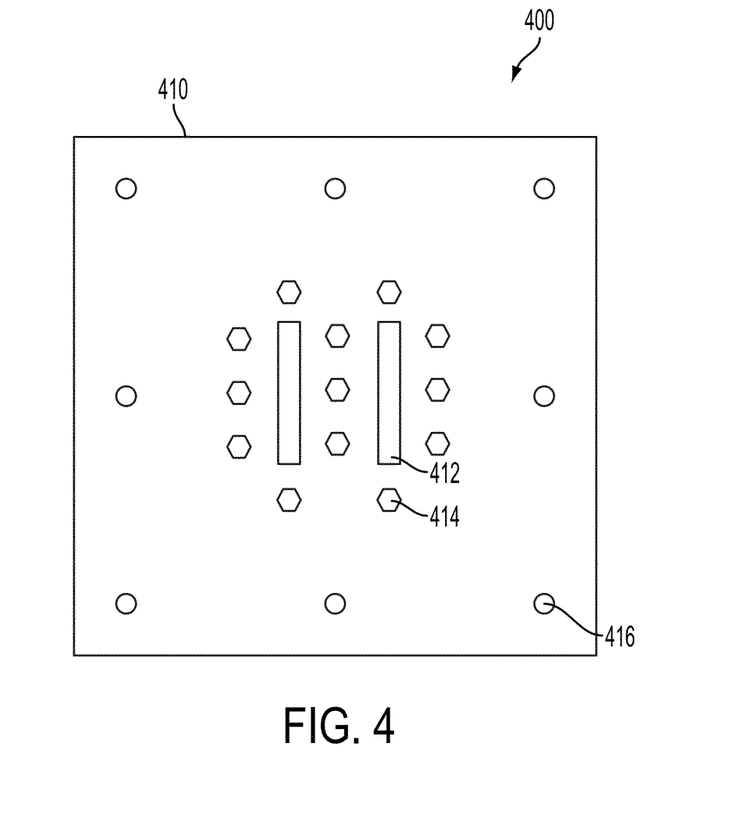
FIG. 4 is a schematic illustration of another embodiment of a head plate of a high throughput powder producing apparatus of the present disclosure.

FIG. 4 is a schematic illustration of another embodiment of a head plate of a high throughput powder producing apparatus 400 of the present disclosure. As shown in FIG. 4, head plate 410 includes two aerosol nozzles 412 that are in the shape of a slot, i.e., an elongated aperture. Each aerosol nozzles is adjacent burner nozzles 414. In this embodiment, each aerosol slot nozzle 412 is surrounded by eight burner nozzles 414. The number of burner nozzles for this type of arrangement will depend, in part, on the length of the slot nozzle. Additional slot aerosol nozzles can be included in the configuration of this embodiment, e.g. 4, 6, 8, 10, 20, 30, 40, 50, 100, 200 or more aerosol nozzles, each of which are directly adjacent two or more burner nozzles. An atomizer can be configured to generate an aerosol of droplets through the slot such as by atomizing a liquid composition with an ultrasonic generator to form an aerosol of droplets and directing the aerosol of droplets through the slot nozzle with a carrier gas, e.g., steam or an inert gas such as nitrogen, argon, etc.

Figure 5A:
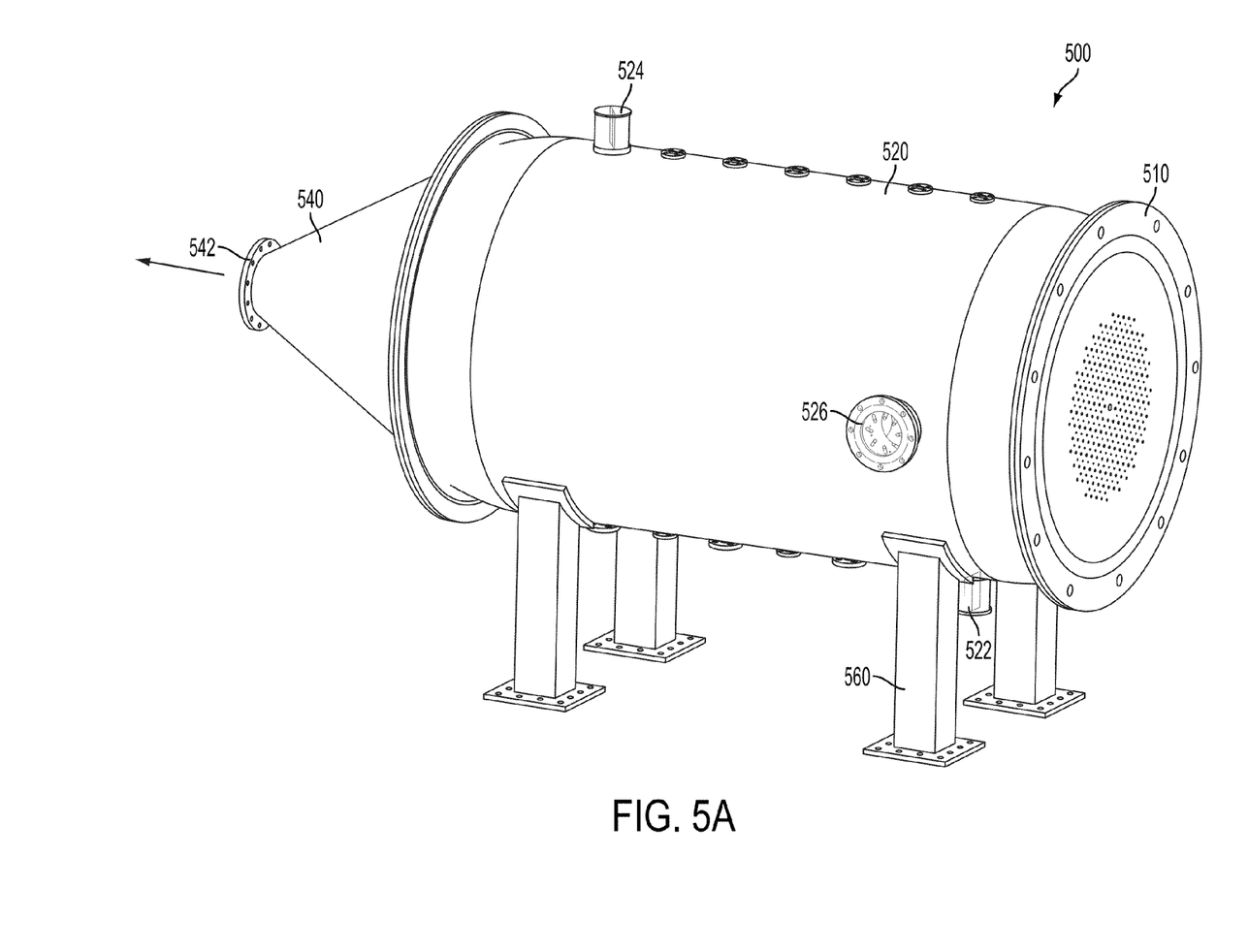
FIGS. 5A and 5B are schematic illustrations of another embodiment of a high throughput powder producing apparatus of the present disclosure.
Figure 5B:
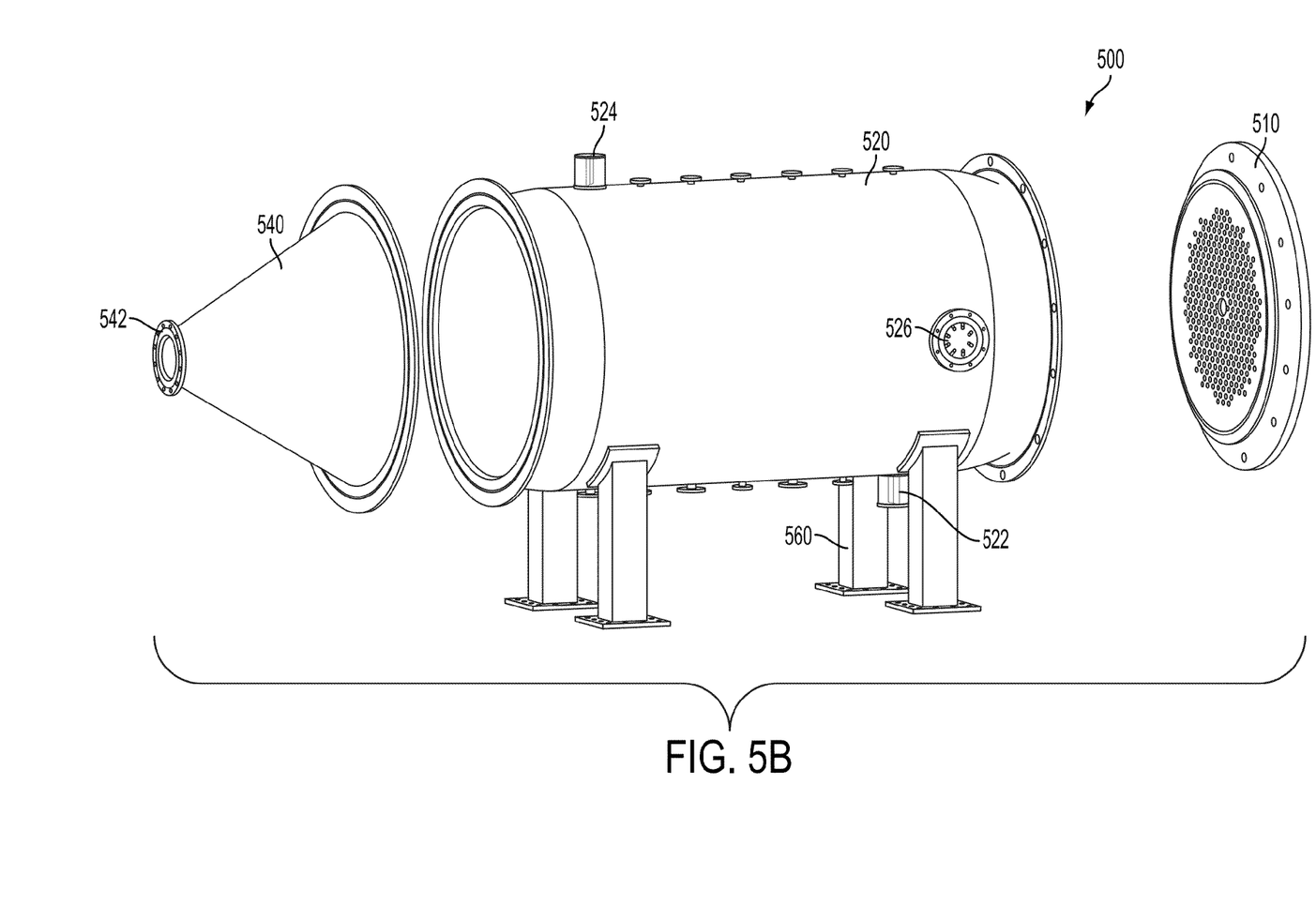

As explained above, the array of nozzles in the apparatus of the present disclosure is readily scalable and so too is the production rate for a given apparatus. As an example, a high throughput powder producing apparatus can have over 100 aerosol nozzles in an array of aerosol and burner nozzles. FIGS. 5A and 5B illustrate another embodiment of a high throughput powder producing apparatus. FIG. 5B is an expanded view of FIG. 5A.

Figure 5C:
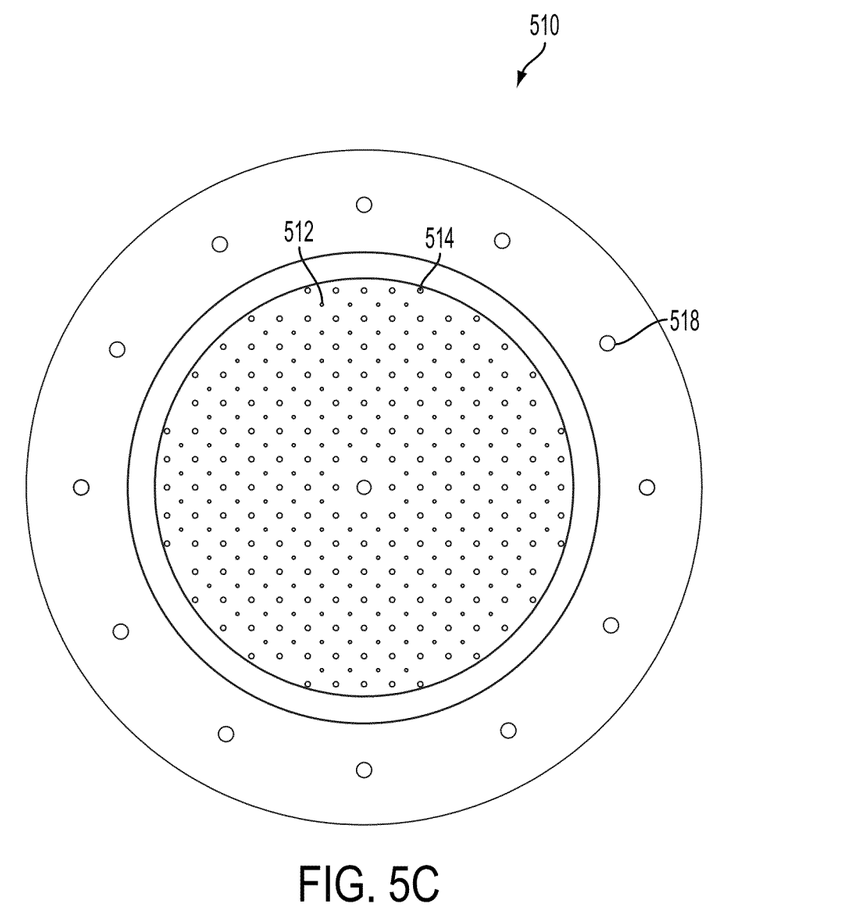
FIG. 5C illustrates the head plate of the apparatus shown in FIG. 5B.

As shown in FIGS. 5A and B, apparatus 500 includes head plate 510, chamber 520, converging neck 540 with exit port 542 and legs 560 connected to chamber 520 to support the apparatus. Head plate 510 includes an array of aerosol nozzles and burner nozzles which are described in more detail in FIG. 5C. The aerosol nozzles and burner nozzles are directed into chamber 520 where the aerosol is heated and optionally mixed with other material, e.g., carbon generated by one or more of the burner nozzles or carbon generated by a burner located at a position away from head plate 510 such as in chamber 520. In this embodiment, chamber 520 is a jacketed chamber with ports 522 and 524 to allow a fluid, e.g., a gas or liquid, to enter and exit chamber 520. The fluid that enters and exits chamber 520 can be used to circulate around an inner wall of chamber 520 (not shown for illustrative convenience) and to maintain chamber 520 at a predetermined temperature or predetermined temperature range, e.g., from about 100° C. to about 800° C., e.g., from about 150° C. to about 500° C. or between about 300° C.-450° C. The circulating fluid used in the chamber 520 can be the fuel used by the burner nozzles to generate flames. By using the fuel as a medium to circulate in the jacket of chamber 520, the fuel can be heated prior to combustion which facilitates combustion of fuel in chamber 520. Other circulating fluids can be used to heat or cool chamber 520. Chamber 520 further includes viewing window 526 for observing the operation of the array of nozzles.

Converging neck 540 converges gases and the particles formed in chamber 520 as they flow from head plate 510 through chamber 520 to exit the apparatus at exit port 542. Connected to exit port 542 is a collection system (not shown for illustrative convenience) to collect powder generated in the process of operating apparatus 500. The collection system can include any conventional system for collecting a powder produced by an aerosol and the like which include, for example, using a bag house, electrostatic precipitator, cyclone, thermophoretic deposition, etc.

Each of the components shown for FIGS. 5A and 5B can be made of a material that is appropriate for the production of powder generally or of a particular powder specifically. Appropriate component materials are typically those that can withstand the temperatures and precursors and their products expected for the production process. Such materials include for example a metal, e.g., steel, stainless steel, aluminum, etc., a ceramic, a glass, or combinations thereof. In this embodiment, head plate 510, first chamber 520, converging neck 540 and legs 560 are all made of stainless steel.

FIG. 5C further illustrates head plate 510 of FIG. 5B. As shown in FIG. 5C, head plate 510 includes an array of spray nozzles 512 to generate an aerosol of droplets and burner nozzles 514 to generate flames directly adjacent the aerosol of droplets. In this embodiment, head plate 510 includes an array of one hundred and forty four (144) spray nozzles 512 and one hundred seventy six (176) burner nozzles 514. As discussed above, it is preferable to have each aerosol nozzle directly adjacent to at least two burner nozzles and to orient the aerosol and burner nozzles to direct their respective aerosol and flames in the same general flow direction. In the present embodiment, each aerosol nozzle is directly adjacent four burner nozzles and all nozzles are oriented to project either an aerosol of droplets or a flame in the same flow direction, i.e. away from head plate 510 and into chamber 520. Head plate 510 further includes bolt holes 518 for bolts that are used to fasten head plate 510 to chamber 520. Although bolts are used to fasten head plate 510 to chamber 520, other applicable means to secure head plate 510 to chamber 520 can also be used.

The apparatus illustrated in FIG. 5A can readily have a production rate of greater than about 18 kg/hr and as high as about 273 kg/hr (i.e., calculated based on production of lithium iron phosphate ($LiFePO_4$, formula weight of about 157.8 g/mole) using a liquid composition between 0.2M to 1M and with 144 aerosol nozzles operating at 4 l/hr to 12 l/hr per aerosol nozzle).

A wide variety of powders can be manufactured by the apparatus of the present disclosure including ceramic, active electrode powders for secondary batteries and fuel cells, etc. The methods for producing powder according to the present disclosure include use of all of the various configurations described above for the apparatuses for producing powder but is not limited or restricted to the various configurations described above.

In practicing embodiments of the present disclosure, a powder is formed by atomizing a liquid composition through at least one aerosol nozzle to project an aerosol of droplets into a chamber. While the liquid composition is atomized into the chamber, the aerosol of droplets is converted to powder by the heat generated by flames of adjacent burner nozzles. The liquid composition of the present disclosure contains a liquid medium and one or more dissolved or suspended precursors and other optional ingredients that result in the production of powder. The process of the present disclosure is advantageously scalable such that the liquid composition can be atomized through 2, 4, 6, 8, 10, 20, 30, 40, 50, 100, 200 or more aerosol nozzles. Preferably the burner nozzles are directly adjacent and among the aerosol nozzles which allow for a more uniform temperature gradient throughout the aerosol and more efficient heating of the aerosol since the flames generated by the burners are used primarily and directly to heat the aerosol of droplets introduced by the one or more aerosol nozzles. Further, it is preferable that each burner nozzle project a flame that is oriented in the same general flow direction as the flow of the aerosol of droplets.

Atomizing a liquid composition of the present disclosure can be done with any aerosol nozzle that can direct an aerosol of droplets into a chamber. The size and type of the aerosol nozzle will depend on several factors including the amount and quality, e.g., size and size distribution, of the aerosol droplets, the tolerances for clogging, temperature and chemical resistance, the desired spray angle, etc. In accordance with embodiments of the present disclosure, the aerosol nozzles can atomize a liquid composition into an aerosol of droplets directly or act as a conduit for an aerosol of droplets formed in a separate chamber and carried to the aerosol nozzle such as in an ultrasonic mister disposed at a distance away from the aerosol nozzle where the aerosol of droplets is generated in the mister and carried to the nozzle via a carrier gas. Aerosol nozzles that directly form an aerosol of droplets are commercially available and include, for example, hydraulic, pneumatic, and ultrasonic spray nozzles. Such nozzles have atomization rates of from about 0.5 l/hr, l/hr, 2 l/hr, 4 l/hr, 6 l/hr, 8 l/hr, 10 l/hr to about 12 l/hr or higher per nozzle and can form droplets having mean droplet diameters as small as about 10 microns and up to about 500 microns. In an embodiment of the present disclosure, the rate of atomizing the liquid composition is no less than about 1 liter per hour per aerosol nozzle (l/hr-nozzle), e.g., no less than about 2, 4, 6, 8, 10, 12 l/hr-nozzle.

Heating the aerosol of droplets can be done by any burner nozzle that is adjacent the aerosol of droplets and oriented in the same general flow direction as the aerosol of droplets and that can provide, in the aggregate, sufficient heat to convert the aerosol of droplets to powder. The size and type of the burner nozzle will depend on the amount and quality of heat needed to process the aerosol of droplets introduced by the one or more aerosol nozzles into the desired product powder. Additional factor for selecting the size and type of burner nozzles and their operation include, for example, the rate of atomization, the arrangement and number of aerosol nozzles to the burner nozzles, the shape of the flame projected from the burner nozzle, flame stability, flame shape, fuel/oxidizer operating ratio, flame temperature, level of turbulence etc. Example burner nozzles that can be used in the apparatus of the present disclosure include diffusion, pre-mix or nozzle-mix gas burners (available from Selas Heat Technology, USA, Fives North American Combustion, Inc., USA). Such burner nozzles have capacities between about 500-58,000 BTU/hr and flame temperatures of around 1,400 K to 3,000 K depending on the fuel and oxidant used to generate the flame and the pressure and ratio of the fuel and oxidant.

As explained above, the burner nozzles project flames which provide heat to convert the liquid composition containing one or more precursors and optional ingredients to powder. The flames are generated by combusting a fuel which includes one or more combustible gases or liquids. Such combustible liquids or gases can include, for example, hydrogen, a hydrocarbon (e.g., one or more of an alkane, such as methane, ethane, propane, butane; an alkene, such as ethylene, propylene, an alkyne, such as acetylene, an aromatic hydrocarbon, such as benzene, toluene, xylene, naphthalene etc.), a mixture of hydrocarbons such as natural gas, gasoline, etc., an alcohol (e.g., one or more of methanol, ethanol, propanol, butanol, either branched or unbranched, etc.), or mixtures of combustible liquids and/or gases. An unburned gas mixture can contain an oxidant, such as oxygen or air. Alternatively, the oxidant can be supplied separately to the burner with the fuel. When the fuel is rich in an unburned mixture relative to oxidant, then all of the oxidant can be consumed thereby leaving an oxidant deficient environment, which can be useful as a reducing environment for certain powder producing applications. When the fuel is even richer, then solid carbon can form, which can be useful also as an additive for certain powder producing applications. In an embodiment of the present disclosure, one or more of the burner nozzles also provides carbon to the aerosol for mixing and/or coating the aerosol particles.

Heating the aerosol of droplets transforms the liquid droplets to solid particles that can be collected as a powder. The process of transforming the liquid droplets to solid particles can include physical and/or chemical conversion of the precursor and/or liquid medium in the droplets as well as evaporation of the medium and/or reaction products. Physical conversion of the components of the droplets can include evaporation, nucleation and crystal formation and growth, for example. Chemical conversion can include oxidation/reduction reactions, pyrolysis and/or carbonization of one or more of the components in the droplets, for example.

The process of the present disclosure can advantageously be a continuous process, e.g., the liquid composition can be continuously atomized and converted to powder. The particle diameter of the resulting powder is tunable and can be as small as a few nanometers and as large as several microns or hundreds of microns.

The factors that affect the rate of powder production and the quality and size of the powder include, for example, the components of the liquid composition and aerosol of droplets, e.g., concentration of precursor(s) and optional ingredients, the liquid medium; the rate of atomization; the droplet size, e.g., the mean droplet diameter; the number and type of aerosols/burner nozzles; the flame temperature and chamber temperature; the pressure; the oxidant (e.g., oxygen) concentration, vapor content etc. Given the guidance of the present disclosure, one skilled in the art can select the appropriate parameters to optimize the production rate, quality and size of the produced powder.

In one aspect of the present disclosure, a process of forming a powder includes atomizing a liquid composition to project an aerosol of droplets having a flow direction into a chamber through at least one aerosol nozzle wherein the chamber includes at least two burner nozzles that are directly adjacent the at least one aerosol nozzle and that each project a flame that is adjacent the aerosol of droplets and oriented in the same general flow direction as the aerosol of droplets. The liquid composition of the present disclosure contains a liquid medium and one or more dissolved or suspended precursors and optionally other ingredients and can be in the form of a solution or suspension, e.g., a colloidal suspension. The flames from the burner nozzles provide heat to convert the aerosol of droplets to a powder.

The liquid medium of the present disclosure includes one or more liquids that are sufficiently volatile to allow formation of an aerosol of droplets. Such liquids include, for example, water; one or more of an alcohol and lower alcohol, e.g., a $C_{1-12}$ alcohol, such as methanol, ethanol, propanol, isopropanol, n-butanol, isobutanol, furfuryl alcohol; a polyhydridic alcohol, such as ethylene glycol, a butanediol, a propanediol; an ether, such as a linear or branched lower ether, dimethyl ether, ethyl ether, methyl ethyl ether, tetrahydrofuran; a ketone and a linear or branched lower ketone, such as acetone, methyl ethyl ketone; an organic acid, such as formic acid, acetic acid, butyric acid, benzoic acid; an organic ester, such as a formate, acetate, propionate; a hydrocarbon, such as a linear or branched alkane, such as a butane, pentane, hexane, heptane, octane, a linear or branched alkene, an aromatic solvent or liquid; a halogenated solvent or liquid such as a chlorinated solvent or liquid; etc.

In an embodiment of the present disclosure, the liquid medium is an aqueous medium which includes water alone as the liquid medium or water with one or more water miscible liquids such as one or more water miscible alcohols, organic acids, etc. The aqueous medium can also contain one or more pH adjusting agents such as inorganic acids, e.g. HCl, nitric acid, sulfuric acid, or bases, e.g., ammonia; one or more surfactants and/or buffers and/or other components as processing aids.

In one aspect of the present disclosure, the process of forming powders includes forming powders for use with batteries and in particular forming powders that are useful as the electrochemically active material in an electrode (hereinafter active electrode powder or powders) of a secondary, i.e., rechargeable, battery.

In its basic form, a battery includes one or more electrochemical cells, which in turn, includes an anode electrode, a cathode electrode and an electrolyte, to transmit ions between the anode and cathode electrodes. The cell can additionally include a separator between the anode and cathode electrodes. Powders produced according to certain embodiments of the present disclosure can be used as one or more of the electrochemically active electrode materials, e.g., as either the active cathode material in a cathode electrode or as the active anode material in an anode electrode, of a secondary battery.

A cathode electrode can be formed by applying one or more electrochemically active cathode powders (hereinafter active cathode powder or powders) on to a current collector. The one or more active cathode powders can be optionally combined with one or more binders and/or with one or more conductive diluents, e.g. conductive carbon and then applied to the current collector to form a cathode electrode which in turn can be assembled in a cell to form a secondary battery. An anode electrode can similarly be prepared by applying one or more electrochemically active anode powders (hereinafter active cathode powder or powders) on to a current collector. The one or more active anode powders can be optionally combined with one or more binders and/or with one or more conductive diluents, e.g. conductive carbon and then applied to the current collector to form an anode electrode which in turn can be assembled in a cell to form a secondary battery.

In an embodiment of the present disclosure, the liquid composition contains one or more precursors to form one or more active lithium electrode powders, e.g., a powder containing one or more active lithium metal anion or lithium mixed metal anion compounds that can be used as the electrochemically active material in either a cathode electrode or anode electrode in a secondary battery. The liquid composition can optionally include one or more dopant precursors and optionally one or more carbon precursors. When present, the one or more dopant precursors can be used to provide a dopant to the powder and the one or more carbon precursors can provide a source of carbon to mix with and/or coat the particles of the powder. The dopant and carbon can be used to enhance the performance of an active lithium electrode powder.

Active lithium metal anion or lithium mixed metal anion compounds of the present disclosure can be represented by the following general formula: $Li_aMI_bMII_cX_d$, where Li represents lithium, MI represents a metal such as a first row transition metal such as Sc, Ti, V, Cr, Mn, Fe, Co, Ni, Cu, Zn or combinations thereof, MII is optionally present and when present can be the same or different metal than MI and can further include metals such as Be, Mg, Ca, Sr, Ba, Pb, Cd, B, Al, Ga, Sn, Sb, or combinations thereof, X represents an anion and a, b, c, d represent the appropriate coordination number for the compound, i.e., integers or fractions thereof. Active lithium metal anion or lithium mixed metal anion compounds that can be formed into powders according to embodiments of the present disclosure include lithium metal and mix-metal oxides and phosphates such as, for example, $Li_4Ti_5O_{12}$, $LiV_3O_8$, $LiMn_2O_4$, $LiCoO_2$, $Li(CoMn)O_4$, $Li(NiMn)O_4LiNiO_2$, $Li(NiMnCo)O_2$, $Li(Ni_{1-x-y}Mn_xCo_y)O_2$, $Li(Ni_{1-x}Co_x)O_2$, $Li(NiCoAl)O_2$ where x and y represent the appropriate coordination number for the compound; lithium metal phosphates such as $LiMPO_4$ where M is Ti, V, Cr, Fe, Co, Mn, Ni, Sn and combinations thereof; $Li_3V_2(PO_4)_3$, $LiFePO_4$, $Li_2FePO_4F$, $Li_x(Fe_{1-y}M_y)PO_4$ wherein M is at least one member selected from the group of Co, Ni, Cu, Zn, Al, Sn, B, Ga, Cr, V, Ti, Mg, Ca and Sr where x and y represent the appropriate coordination number for the compound; LiZnSb, Li—S, etc.

In one aspect of the present discloser, the liquid composition contains a liquid medium, e.g., an aqueous medium, and one or more dissolved or suspended precursors to form one or more active lithium metal or mix-metal oxide powders or one or more active lithium metal or mix-metal phosphate powders. The liquid composition including such precursors can optionally include one or more dopant precursors and optionally one or more carbon precursors and optionally one or more other ingredients to aid in the process.

Precursors that can be included in the liquid composition and used to form active electrode powders of the present disclosure include, for example, lithium, metal and anion precursors, which may be in the form of separate materials or in the form of a material that combines two or more of these elements. For example, the lithium, metal and anion precursors can be a compound including lithium, metal and anion, respectively, and at least one element of hydrogen, oxygen, sulfur, nitrogen, phosphorous, carbon and halogens, such as bromine, chlorine and iodine. Examples of such precursors include one or more lithium precursors such as a lithium organometallic, lithium acetate, lithium hydroxide, lithium nitrate ($LiNO_3$), lithium oxalate, lithium oxide, lithium phosphate, lithium dihydrogen phosphate, lithium carbonate ($Li_2CO_3$); metal precursors such as an organometallic, a Sc, Ti, V, Cr, Mn, Fe, Co, Ni, Cu, Zn, and Mg acetate, citrate, lactate, sulfate, nitrate, alkoxide, hydroxide, etc., ammonium metal oxides such as ammonium metavanadate ($NH_4VO_3$), ammonium metal sulfate precursors such as $(NH_4)_2Fe(SO_4)_2$; anion precursors such as one or more phosphate precursors such as phosphoric acid ($H_3PO_4$), $P_2O_5$, ammonium phosphate ($(NH_4)_3PO_4$), ammonium dihydrogen phosphate ($NH_4H_2PO_4$), etc.

In one aspect of the present disclosure, the liquid composition includes water and one or more water miscible liquids and precursors for producing lithium iron phosphate powder. Such a liquid composition can be prepared by combining water and optionally one or more water miscible liquid, with one or more dissolved or suspended precursors for producing lithium iron phosphate powder. Such precursors include, for example, combining one or more lithium precursors such as lithium acetate, lithium hydroxide, lithium nitrate ($LiNO_3$), lithium oxalate, lithium oxide, lithium phosphate, lithium dihydrogen phosphate, lithium carbonate ($Li_2CO_3$), with one or more iron precursors, such as iron sulfate, iron acetate, iron (II) oxalate ($FeC_2O_4$), iron (III) citrate, iron (II) chloride (FeCl2), iron (II) lactate, iron (III) nitrate, iron carbonate, with one or more phosphate precursors such as phosphoric acid ($H_3PO_4$), $P_2O_5$, ammonium phosphate ($(NH_4)_3PO_4$), ammonium dihydrogen phosphate ($NH_4H_2PO_4$), etc. The liquid composition including such precursors can optionally include one or more dopant precursors and optionally one or more carbon precursors.

Other embodiments of the present disclosure include a liquid composition for producing $LiCoO_2$ powder, which can be prepared, for example, by combining an aqueous medium, e.g., water and optionally a water miscible liquid, with lithium nitrate and cobalt nitrate. A liquid composition for producing $LiMn_2O_4$ powder, which can be prepared by combining an aqueous medium, e.g., water and optionally a water miscible liquid, with lithium nitrate and manganese nitrate. The liquid composition including such precursors can optionally include other ingredients, e.g., one or more dopant precursors and/or one or more carbon precursors.

Dopant precursors that can be included in the liquid composition include for example, a fine metal powder or an organometallic that contain one or more of magnesium, aluminum, titanium, zirconium, vanadium, niobium, tantalum, chromium, molybdenum, tungsten, manganese, technetium, etc. or mixtures thereof. Such dopant precursors include, for example, magnesium acetate, ammonium metavanadate ($NH_4VO_3$), chromium acetate hydroxide ($Cr_3(OH)_2(OOCCH_3)_7$), chromium nitrate ($Cr(NO_3)$), manganese acetate (Mn(II) $(CH_3COO)_2$, Mn(III) $OAc_2H_2O_2$), $Nb_2O_5$, $MnCO_3$, $MgSO_4$, $Al(NO_3)_2$, $Mg(CH_3CO_2)_2$, $Zn(OC_2H_5)_4$, $Ti(OCH_3)_4$, fine metal powder of the dopant, etc. Addition of one or more dopants to the liquid composition including precursors to form active electrode powders can result in a doped active electrode powder.

Additional ingredients can be added to the liquid composition to enhance the performance of the resultant powder. In one aspect of the present disclosure, ingredients are added to a liquid composition for producing active electrode powder to improve the performance of the active electrode powder for use in a secondary battery. Such ingredients include, for example, one or more chelators to help dissolution of metal precursors in the liquid composition, one or more carbon precursors, e.g., a precursor that can carbonize to a substantially carbon containing material (i.e., at least 95% carbon). Such carbon precursors are advantageous in producing active electrode powders because the carbonized form of the carbon precursor can mix with and/or coat the active electrode powder and thereby act as a source of carbon that is generated during the process of producing active electrode powder. Preferably the carbon precursor carbonizes to a form of carbon containing material that improves the electrical conductivity of the active electrode powder. Such carbon precursors include, for example, one or more organic acids, such as acetic acid, citric acid, ascorbic acid, oxalic acid, lauric acid, organic aromatic acids such as benzoic acid, phthalic acid ($C_6H_4(CO_2H)_2$), trimellitic acid ($C_6H_3(CO_2H)_3$), pyromellitic acid ($C_6H_2(CO_2H)_4$), mellitic acid ($C_6(CO_2H)_6$), one or more polyhydric alcohol such as sucrose, glucose, fructose, ethylene glycol, polymers such as polyethylene glycol, polyvinyl alcohol, polyvinylpyrrolidone. However, use of any polymers with the liquid composition is preferably in low concentration (e.g., less than 20 wt % relative to total liquid composition) since polymers appear to have a tendency to agglomerate produced powder.

In some instances the ingredients of the liquid composition can have multiple roles such as acting as both a chelator and a carbon precursor. Additional ingredients can be added to the liquid composition for enhancing the performance of the produced active electrode powder such as conducting carbon, such as acetylene black, SUPER P® and SUPER P® Li conductive carbon black (available from TIMCAL Ltd.), carbon nanotubes, etc.

In one aspect of the present disclosure, a process of forming a powder includes atomizing a liquid composition containing one or more lithium, metal and anion precursors, and optionally one or more dopant precursors and optionally one or more carbon precursors to project an aerosol of droplets having a flow direction into a chamber through at least one aerosol nozzle, e.g., at least 6 or at least 20 aerosol nozzles. The chamber of this embodiment includes at least two burner nozzles that are directly adjacent each aerosol nozzle. Each burner nozzle projects a flame that is adjacent the aerosol of droplets and oriented in the same general flow direction as the aerosol of droplets. The heat from the flames converts the aerosol of droplets to form one or more active lithium metal or mixed metal oxide powders or active lithium metal or mixed metal phosphate powders that are optionally doped and optionally mixed and/or coated with carbon.

In one aspect of the present disclosure, the burner flames can also form carbon particles for combining with the resulting powder generated by the aerosol of droplets. The burner flames can be made to form carbon particles by combusting a hydrocarbon without sufficient oxidant to completely combust the hydrocarbon such as using a flame rich in hydrocarbon fuel. An additional advantage of using a flame rich with hydrocarbon fuel is that such a flame can maintain a reducing environment in the chamber during production of the aerosol of droplets thereby minimizing oxidation of precursors to an undesirable state.

As explained above, the process of forming powders of the present disclosure includes forming powders that are useful as the electrochemically active cathode or anode material in a secondary battery. After producing active electrode powder by atomizing a liquid composition through an aerosol nozzle, the powder can be further processed. For example, the powder can undergo a heat treatment such as by subjecting the powder to high temperatures, e.g., greater than about 600° C., in an unconditioned atmosphere, e.g., an open atmosphere, or under an inert or reducing atmosphere or under vacuum. In one embodiment of the present disclosure, the active electrode powder is subjected to a heat treatment step. Following heat treatment, the active electrode powder is optionally mixed with a binder and conductive diluent and applied to a current collector to form an electrode, e.g., a cathode or anode electrode, and assembled in a battery.

EXAMPLES

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

Using an apparatus as illustrated in FIG. 1, but oriented horizontally, the following powders were produced.

Example A

Chromium Doped LiFePO$_4$/C

A 0.3 molar precursor aqueous mixture was prepared by dissolving 87 g of ferrous lactate (available from Sigma-Aldrich) with an optimized amount of citric acid (available from Sigma-Aldrich) in approximately 1.5 L of water. Then, 34 g of phosphoric acid (available from Sigma-Aldrich) and 11 g of lithium carbonate (available from Alfa-Aesar) were added to the aqueous mixture containing citric acid and ferrous lactate in sequence. The citric acid in this example acts as both an iron ion chelator and a carbon precursor. A small amount of chromium acetate was also added to the aqueous mixture as a dopant precursor to dope the resultant active lithium metal phosphate powder.

The aqueous composition containing the various precursors was introduced as an aerosol of droplets into a mixing chamber through an array of spray nozzles. In this particular example, 6 aerosol nozzles were used, each running at a rate of about 3 l/hr. A total of 7 burner nozzles were used, each running at an air and propane mixture flow rate of about 70 L/min and an equivalence ratio of about 1.2. At least three burner nozzles were directly adjacent each aerosol nozzle. The temperatures of chamber 120 and 130 were maintained at roughly 350° C. In this particular run, 43 g of chromium doped LiFePO$_4$/C powder was collected via a baghouse filter.

The collected powder was subsequently heat treated in a tubular furnace at about 750° C. for 2 hrs in a 5% H$_2$/95% N$_2$ reducing atmosphere.

A cathode electrode was formed from the active cathode powder produced according to this example. A cathode film was fabricated initially by combining the produced LiFePO$_4$/C powder (80 wt %) with Super-P carbon (10 wt %), and polyvinylidene fluoride (10 wt %) dispersed in N-methylpyrrolidinone to form a slurry. The slurry was coated onto aluminum (Al) foil using a doctor blade technique, dried overnight at 130° C. under vacuum, then roller-pressed to achieve good adherence between the coated material and Al foil. Cathode discs of 15 mm diameter were punched using a precision cutter.

The electrochemical properties of the produced LiFePO$_4$/C were determined by tests in 2016-type coin half-cells assembled inside a glove box filled with high purity argon. The cell included the cathode disc and a lithium metal anode separated by a microporous polypropylene separator.

A solution of 1M LiPF$_6$ in a 1:1 volume mixture of ethylene carbonate and diethyl carbonate was used as the electrolyte.

The cell was charged and discharged at rates varying from 0.1 to 1 C, where the C-rate signifies the charge or discharge rate equal to the theoretical capacity of the battery in one hour. The initial discharge capacity of a coin cell battery made with a cathode electrode including powder produced according to this example was greater than 125 mAh/g at 0.1 C and greater than 110 mA/g at 1 C.

Example B

Vanadium Doped LiFePO$_4$/C

A 0.3 molar precursor aqueous mixture was prepared with stoichiometric amounts of ferrous lactate, phosphoric acid, lithium carbonate in approximately 1.5 L water. An optimized amount of citric was initially added to act as both a chelating agent and carbon precursor. A small amount of ammonium metavanadate was also added as a dopant precursor to the aqueous mixture to dope the produced powder. In this particular run, 47 g of vanadium doped LiFePO4/C powder was collected via a baghouse filter.

The collected powder was subsequently heat treated in a tubular furnace at about 750° C. for 2 hrs in a 5% H$_2$/95% N$_2$ reducing atmosphere.

A test cell was assembled similarly to the cell described in Example A but with powder produced according to this example. The cell was charged and discharged at rates varying from 0.1 to 1 C. The initial discharge capacity of a coin cell battery made with a cathode electrode including powder produced according to this example was greater than 125 mAh/g at 0.1 C and greater than 110 mA/g at 1 C.

Example C

Lithium Nickel Cobalt Manganese Oxide

A 0.3 molar precursor aqueous mixture was prepared with stoichiometric amounts of lithium nitrate, nickel nitrate, cobalt nitrate, and manganese nitrate in 1.5 L of water. In this particular run, 24 g of NCM powder (nominally Li (Ni$_{1/3}$Co$_{1/3}$Mn$_{1/3}$)O$_2$) was collected via a baghouse filter.

The collected powder was subsequently heat treated in a tubular furnace at 800° C. for 2 hrs in open air.

A test cell was assembled similarly to the cell described in Example A but with powder produced according to this example. The cell was charged and discharged at rates varying from 0.1 to 1 C. The initial discharge capacity of a coin cell battery made with a cathode electrode including powder produced according to this example was greater than 125 mAh/g at 0.1 C and greater than 110 mA/g at 1 C.

Example D

Lithium Iron Manganese Phosphate

A 0.3 molar precursor aqueous mixture was prepared with stoichiometric amounts of ferrous lactate, manganese acetate, phosphoric acid, and lithium carbonate in 1.5 L of water. An optimized amount of citric acid was initially added to act as a chelating agent and carbon source. In this particular run, 45 g of LiFe$_{0.7}$Mn$_{0.3}$PO$_4$/C powder was collected via a baghouse filter.

The collected powder was subsequently heat treated in a tubular furnace at about 750° C. for 2 hrs in a 5% H$_2$/95% N$_2$ reducing atmosphere.

A test cell was assembled similarly to the cell described in Example A but with powder produced according to this example. The cell was charged and discharged at rates varying from 0.1 to 1 C. The initial discharge capacity of a coin cell battery made with a cathode electrode including powder produced according to this example was greater than 125 mAh/g at 0.1 C and greater than 110 mA/g at 1 C.

Table 1[†]

| Example | Atomization Flow Rate (1/hr) | Fuel | Fuel/Air Equivalence Ratio | Chamber Temp. (° C.) |
|---|---|---|---|---|
| A | 3 | Propane | 1.2 | 350 |
| B | 3 | Propane | 1.2 | 350 |
| C | 3 | Propane | 1.2 | 350 |
| D | 3 | Propane | 1.2 | 350 |

[†]The values for the Atomization Flow Rate, Fuel Air Equivalence Ratio, and Chamber Temperature are approximate.

Only the preferred embodiments of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. An apparatus for producing powder, the apparatus comprising:
   a chamber having a head plate;
   an array of nozzles attached to the head plate, wherein the array of nozzles includes at least four aerosol nozzle for introducing an aerosol of droplets into the chamber and at least two burner nozzles directly adjacent each aerosol nozzle for projecting flames into the chamber and wherein the aerosol and flames are oriented in the same general flow direction; and
   an exit port connected to the chamber which allows produced powder to exit the chamber.

2. The apparatus of claim 1, wherein the array of nozzles includes at least 6 aerosol nozzles, each of which are directly adjacent at least two burner nozzles.

3. The apparatus of claim 1, wherein the array of nozzles includes at least 20 aerosol nozzles, each of which are directly adjacent at least two burner nozzles.

4. The apparatus of claim 1, wherein the aerosol nozzles are aerosol pneumatic spray nozzles.

5. The apparatus of claim 1, wherein the array of nozzles includes at least three burner nozzles directly adjacent each aerosol nozzles.

6. The apparatus of claim 1, wherein each burner nozzle projects a flame in the shape of a spear.

7. The apparatus of claim 6, wherein the aerosol nozzles are aerosol pneumatic spray nozzles.

8. The apparatus of claim 1, wherein the apparatus has a production rate of greater than 1 kilogram per hour (kg/hr).

9. The apparatus of claim 1, wherein the apparatus has a production rate of greater than about 10 kilogram per hour (kg/hr).

10. The apparatus of claim 1, further comprising a collection system in fluid communication with the exit port to collect produced powder exiting the chamber.

11. A process of forming a powder, the process comprising: atomizing a liquid composition to project an aerosol of droplets having a flow direction into a chamber through at least four aerosol nozzle wherein the chamber includes at least two burner nozzles that are directly adjacent each aerosol nozzle and that each project a flame that is adjacent the aerosol of droplets and oriented in the same general flow direction as the aerosol of droplets and wherein the liquid composition contains one or more dissolved or suspended precursors and the flames provide heat to convert the aerosol of droplets to a powder.

12. The process of claim 11, wherein atomizing the liquid composition to project the aerosol of droplets is through at least 20 aerosol nozzles and wherein the chamber includes at least two burner nozzles that are directly adjacent each aerosol nozzle to project flames adjacent the aerosol of droplets.

13. The process of claim 11, wherein the rate of atomizing the liquid composition is no less than about 1 liter per hour per aerosol nozzle.

14. The process of claim 11, wherein aerosol nozzle or nozzles is or are a pneumatic spray nozzle or nozzles and wherein the at least two burner nozzles each project a flame in the shape of a spear.

15. The process of claim 11, wherein the liquid composition contains precursors to form one or more active electrode powders and optionally one or more dopant precursors and optionally one or more carbon precursors.

16. The process of claim 15, wherein the liquid composition contains precursors to form one or more active lithium metal or mixed metal phosphate powders.

17. The process of claim 16, wherein the liquid composition further includes one or more carbon precursors that carbonizes to a substantially carbon containing material to mix with and/or coat the one or more active lithium metal or mixed metal phosphate powders.

18. The process of claim 15, wherein the liquid composition contains a dopant precursor to dope the one or more active electrode powders.

19. The process of claim 15, wherein one or more of the burner nozzles generates carbon that mixes with the aerosol of droplets and/or powder therefrom.

20. The process of claim 15, further comprising forming an electrode from the one or more active electrode powders.

21. The process of claim 20, further comprising forming a secondary battery with the electrode.

* * * * *